(12) United States Patent
Binder

(10) Patent No.: US 7,447,144 B2
(45) Date of Patent: Nov. 4, 2008

(54) TELEPHONE COMMUNICATION SYSTEM AND METHOD OVER LOCAL AREA NETWORK WIRING

(75) Inventor: Yehuda Binder, Hod Ha'sharon (IL)

(73) Assignee: Serconet, Ltd., Raanana (IL)

( * ) Notice: Subject to any disclaimer, the term of this patent is extended or adjusted under 35 U.S.C. 154(b) by 621 days.

(21) Appl. No.: 11/187,994

(22) Filed: Jul. 25, 2005

(65) Prior Publication Data

US 2005/0254494 A1 Nov. 17, 2005

Related U.S. Application Data

(63) Continuation of application No. 11/125,200, filed on May 10, 2005, which is a continuation of application No. 09/666,856, filed on Sep. 21, 2000, now Pat. No. 6,961,303.

(51) Int. Cl.
 *H04J 15/00* (2006.01)
(52) U.S. Cl. ............... 370/200; 370/258; 370/352; 370/434; 379/158
(58) Field of Classification Search ......... 370/200–214, 370/258, 352–354, 434, 445; 379/156, 158, 379/166, 359; 375/343
See application file for complete search history.

(56) References Cited

U.S. PATENT DOCUMENTS

| | | | |
|---|---|---|---|
| 3,699,523 A | 10/1972 | Percher |
| 3,717,858 A | 2/1973 | Hadden |
| 3,806,814 A | 4/1974 | Forbes |
| 3,959,772 A | 5/1976 | Wakasa et al. |
| 3,975,594 A | 8/1976 | Guntersdorfer |
| 4,173,714 A | 11/1979 | Bloch et al. |
| 4,272,759 A | 6/1981 | Handy |
| 4,389,694 A | 6/1983 | Cornwell, Jr. |
| 4,463,341 A | 7/1984 | Iwasaki |
| 4,467,314 A | 8/1984 | Weikel et al. |
| 4,477,896 A | 10/1984 | Aker |

(Continued)

FOREIGN PATENT DOCUMENTS

EP 0355532 2/1990

(Continued)

OTHER PUBLICATIONS

Donnan, et al; "Token Ring Access Method and Physical Layer Specifications"; ANSI/IEEE Standard for Local Area Networks; ANSI/IEEE 802.5; 89 pages, 1985.

(Continued)

*Primary Examiner*—Afsar M. Qureshi
(74) *Attorney, Agent, or Firm*—Browdy and Neimark

(57) ABSTRACT

A method and apparatus for enabling a local area network wiring structure to simultaneously carry digital data and analog telephone signals on the same transmission medium. It is particularly applicable to a network in star topology, in which remote data units (e.g. personal computers) are each connected to a hub through a cable comprising at least two pairs of conductors, providing a data communication path in each direction. Modules at each end of the cable provide a phantom path for telephony (voice band) signals between a telephone near the data set and a PBX, through both conductor pairs in a phantom circuit arrangement. All such communication paths function simultaneously and without mutual interference. The modules comprise simple and inexpensive passive circuit components.

26 Claims, 9 Drawing Sheets

U.S. PATENT DOCUMENTS

| | | |
|---|---|---|
| 4,510,493 A | 4/1985 | Bux |
| 4,535,401 A | 8/1985 | Penn |
| 4,633,217 A | 12/1986 | Akano |
| 4,639,714 A | 1/1987 | Crowe |
| 4,672,605 A | 6/1987 | Hustig et al. |
| 4,733,389 A | 3/1988 | Puvogel |
| 4,734,919 A | 3/1988 | Tae |
| 4,736,367 A | 4/1988 | Wroblewski et al. |
| 4,761,646 A | 8/1988 | Choquet et al. |
| 4,766,402 A | 8/1988 | Crane |
| 4,785,448 A | 11/1988 | Reichert et al. |
| 4,799,211 A | 1/1989 | Felker et al. |
| 4,803,485 A | 2/1989 | Rypinski |
| 4,806,905 A | 2/1989 | McGowan, III et al. |
| 4,807,225 A | 2/1989 | Fitch |
| 4,815,106 A | 3/1989 | Propp et al. |
| 4,890,102 A | 12/1989 | Oliver |
| 4,918,690 A | 4/1990 | Markkula, Jr. et al. |
| 4,924,492 A | 5/1990 | Gitlin et al. |
| 4,926,158 A | 5/1990 | Zeigler |
| 4,937,811 A | 6/1990 | Harris |
| 4,953,055 A | 8/1990 | Douhet et al. |
| 4,992,774 A | 2/1991 | McCullough |
| 5,021,779 A | 6/1991 | Bisak |
| 5,025,443 A | 6/1991 | Gupta |
| 5,032,819 A | 7/1991 | Sakuragi et al. |
| 5,033,062 A | 7/1991 | Morrow et al. |
| 5,033,112 A | 7/1991 | Bowling et al. |
| 5,034,531 A | 7/1991 | Friary et al. |
| 5,065,133 A | 11/1991 | Howard |
| 5,089,927 A | 2/1992 | Bulan et al. |
| 5,089,974 A | 2/1992 | Demeyer et al. |
| 5,121,482 A | 6/1992 | Patton |
| 5,144,544 A | 9/1992 | Jenneve et al. |
| 5,148,144 A | 9/1992 | Sutterlin et al. |
| 5,285,477 A | 2/1994 | Leonowich |
| 5,311,518 A | 5/1994 | Takato et al. |
| 5,347,549 A | 9/1994 | Baumann et al. |
| 5,368,041 A | 11/1994 | Shambroom |
| 5,381,804 A | 1/1995 | Shambroom |
| 5,391,932 A | 2/1995 | Small et al. |
| 5,406,260 A | 4/1995 | Cummings et al. |
| 5,414,708 A | 5/1995 | Webber et al. |
| 5,422,519 A | 6/1995 | Russell |
| 5,438,678 A | 8/1995 | Smith |
| 5,450,393 A | 9/1995 | Watanabe et al. |
| 5,451,923 A | 9/1995 | Seberger et al. |
| 5,457,629 A | 10/1995 | Miller et al. |
| 5,469,150 A | 11/1995 | Sitte |
| 5,477,091 A | 12/1995 | Fiorina et al. |
| 5,483,656 A | 1/1996 | Oprescu et al. |
| 5,491,402 A | 2/1996 | Small |
| 5,517,172 A | 5/1996 | Chiu |
| 5,525,962 A | 6/1996 | Tice |
| 5,528,089 A | 6/1996 | Guiset et al. |
| 5,530,748 A | 6/1996 | Ohmori |
| 5,535,336 A | 7/1996 | Smith et al. |
| 5,546,385 A | 8/1996 | Caspi et al. |
| 5,563,515 A | 10/1996 | Kako |
| 5,572,182 A | 11/1996 | De Pinho Filho et al. |
| 5,579,486 A | 11/1996 | Oprescu et al. |
| 5,610,552 A | 3/1997 | Schlesinger et al. |
| 5,610,922 A | 3/1997 | Balatoni |
| 5,635,896 A | 6/1997 | Tinsley et al. |
| 5,644,286 A | 7/1997 | Brosh et al. |
| 5,652,893 A | 7/1997 | Ben-Meir et al. |
| 5,680,397 A | 10/1997 | Christensen et al. |
| 5,684,826 A | 11/1997 | Ratner |
| 5,689,230 A | 11/1997 | Merwin et al. |
| 5,748,634 A | 5/1998 | Sokol et al. |
| 5,796,965 A | 8/1998 | Choi et al. |
| 5,799,196 A | 8/1998 | Flannery |
| 5,805,597 A | 9/1998 | Edem |
| 5,815,681 A | 9/1998 | Kikinis |
| 5,828,293 A | 10/1998 | Rickard |
| 5,828,558 A | 10/1998 | Korcharz et al. |
| 5,841,360 A | 11/1998 | Binder |
| 5,841,841 A | 11/1998 | Dodds et al. |
| 5,859,584 A | 1/1999 | Counsell et al. |
| 5,859,596 A | 1/1999 | McRae |
| 5,884,086 A | 3/1999 | Amoni et al. |
| 5,896,443 A | 4/1999 | Dichter |
| 5,930,340 A | 7/1999 | Bell |
| 5,939,801 A | 8/1999 | Bouffard et al. |
| 5,944,831 A | 8/1999 | Pate et al. |
| 5,960,066 A | 9/1999 | Hartmann et al. |
| 5,960,208 A | 9/1999 | Obata et al. |
| 5,973,942 A | 10/1999 | Nelson et al. |
| 5,974,553 A | 10/1999 | Gandar |
| 5,982,052 A | 11/1999 | Sosnowski |
| 5,990,577 A | 11/1999 | Kamioka et al. |
| 5,991,885 A | 11/1999 | Chang et al. |
| 5,994,998 A | 11/1999 | Fisher et al. |
| 6,016,519 A | 1/2000 | Chida et al. |
| 6,025,945 A | 2/2000 | Nyu et al. |
| 6,026,078 A | 2/2000 | Smith |
| 6,033,101 A | 3/2000 | Reddick et al. |
| 6,038,457 A | 3/2000 | Barkat |
| 6,049,471 A | 4/2000 | Korcharz et al. |
| 6,049,881 A | 4/2000 | Massman et al. |
| 6,055,633 A | 4/2000 | Schrier et al. |
| 6,087,835 A | 7/2000 | Haneda |
| 6,095,867 A | 8/2000 | Brandt et al. |
| 6,097,761 A | 8/2000 | Buhring et al. |
| 6,114,632 A | 9/2000 | Planas, Sr. et al. |
| 6,115,468 A | 9/2000 | De Nicolo |
| 6,115,755 A | 9/2000 | Krishan |
| 6,115,822 A | 9/2000 | Kim et al. |
| 6,125,448 A | 9/2000 | Schwan et al. |
| 6,141,763 A | 10/2000 | Smith et al. |
| 6,166,496 A | 12/2000 | Lys et al. |
| 6,175,556 B1 | 1/2001 | Allen, Jr. et al. |
| 6,188,314 B1 | 2/2001 | Wallace et al. |
| 6,218,930 B1 | 4/2001 | Katzenberg et al. |
| 6,243,818 B1 | 6/2001 | Schwan et al. |
| 6,246,748 B1 | 6/2001 | Yano |
| 6,301,527 B1 | 10/2001 | Butland et al. |
| 6,308,240 B1 | 10/2001 | De Nicolo |
| 6,310,781 B1 | 10/2001 | Karam |
| 6,348,874 B1 | 2/2002 | Cole et al. |
| 6,363,066 B1 | 3/2002 | Frimodig |
| 6,366,143 B1 | 4/2002 | Liu et al. |
| 6,377,874 B1 | 4/2002 | Ykema |
| 6,389,139 B1 | 5/2002 | Curtis et al. |
| 6,393,607 B1 | 5/2002 | Hughes et al. |
| 6,396,391 B1 | 5/2002 | Binder |
| 6,448,899 B1 | 9/2002 | Thompson |
| 6,449,348 B1 | 9/2002 | Lamb et al. |
| 6,459,175 B1 | 10/2002 | Potega |
| 6,459,275 B1 | 10/2002 | Ewalt et al. |
| 6,470,401 B1 | 10/2002 | Peterson |
| 6,473,608 B1 | 10/2002 | Lehr et al. |
| 6,477,457 B1 | 11/2002 | Fendt et al. |
| 6,480,122 B1 | 11/2002 | Oddy et al. |
| 6,496,103 B1 | 12/2002 | Weiss et al. |
| 6,522,515 B1 | 2/2003 | Whitney |
| 6,529,443 B2 | 3/2003 | Downey, Jr. et al. |
| 6,535,983 B1 | 3/2003 | McCormack et al. |
| 6,541,878 B1 | 4/2003 | Diab |
| 6,546,494 B1 | 4/2003 | Jackson et al. |
| 6,553,076 B1 | 4/2003 | Huang |
| 6,556,564 B2 | 4/2003 | Rogers |
| 6,571,181 B1 | 5/2003 | Rakshani et al. |
| 6,574,741 B1 | 6/2003 | Fujimori et al. |

| | | |
|---|---|---|
| 6,587,454 B1 | 7/2003 | Lamb |
| 6,603,220 B2 | 8/2003 | Vergnaud |
| 6,640,308 B1 | 10/2003 | Keyghobad et al. |
| 6,643,566 B1 | 11/2003 | Lehr et al. |
| 6,648,308 B2 | 11/2003 | Gunnar Rothoff |
| 6,650,622 B1 | 11/2003 | Austerman, III et al. |
| 6,658,109 B1 | 12/2003 | Steinke et al. |
| 6,681,013 B1 | 1/2004 | Miyamoto |
| 6,701,443 B1 | 3/2004 | Bell |
| 6,715,087 B1 | 3/2004 | Vergnaud et al. |
| 6,738,641 B1 | 5/2004 | Elsasser |
| 6,762,675 B1 | 7/2004 | Cafiero et al. |
| 6,764,343 B2 | 7/2004 | Ferentz |
| 6,800,957 B2 | 10/2004 | Nerone et al. |
| 6,804,351 B1 | 10/2004 | Karam |
| 6,841,979 B2 | 1/2005 | Berson et al. |
| 6,870,282 B1 | 3/2005 | Bischoff et al. |
| 6,880,020 B1 | 4/2005 | Rubinstein et al. |
| 6,906,618 B2 | 6/2005 | Hair, III et al. |
| 6,912,145 B2 | 6/2005 | Hung et al. |
| 6,912,282 B2 | 6/2005 | Karam |
| 6,954,863 B2 | 10/2005 | Mouton |
| 6,956,462 B2 | 10/2005 | Jetzt |
| 6,961,303 B1 | 11/2005 | Binder |
| 6,973,394 B2 | 12/2005 | Jaeger et al. |
| 6,975,209 B2 | 12/2005 | Gromov |
| 6,977,507 B1 | 12/2005 | Pannell et al. |
| 6,986,071 B2 | 1/2006 | Darshan et al. |
| 6,996,458 B2 | 2/2006 | Pincu et al. |
| 7,023,809 B1 | 4/2006 | Rubinstein et al. |
| 7,026,730 B1 | 4/2006 | Marshall et al. |
| 7,030,733 B2 | 4/2006 | Abbarin |
| 7,046,983 B2 | 5/2006 | Elkayam et al. |
| 7,049,514 B2 | 5/2006 | Brandt et al. |
| 7,053,501 B1 | 5/2006 | Barrass |
| 7,061,142 B1 | 6/2006 | Marshall |
| 7,068,781 B2 | 6/2006 | Le Creff et al. |
| 7,072,995 B1 | 7/2006 | Burroughs |
| 7,079,647 B2 | 7/2006 | Tomobe |
| 7,081,827 B2 | 7/2006 | Addy |
| 7,089,126 B2 | 8/2006 | Muir |
| 2002/0063584 A1 | 5/2002 | Molenda et al. |
| 2002/0159402 A1 | 10/2002 | Binder |
| 2003/0061522 A1 | 3/2003 | Ke et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2004/0073597 A1 | 4/2004 | Caveney et al. |
| 2004/0146061 A1 | 7/2004 | Bisceglia et al. |
| 2004/0164619 A1 | 8/2004 | Parker et al. |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0268160 A1 | 12/2004 | Atkinson et al. |
| 2005/0053087 A1 | 3/2005 | Pulyk |
| 2005/0063108 A1 | 3/2005 | Voll et al. |
| 2005/0078700 A1 | 4/2005 | Thompson et al. |
| 2005/0097369 A1 | 5/2005 | Bowser et al. |
| 2005/0125507 A1 | 6/2005 | Atias et al. |
| 2005/0136972 A1 | 6/2005 | Smith et al. |
| 2005/0136989 A1 | 6/2005 | Dove |
| 2005/0152306 A1 | 7/2005 | Bonnassieux et al. |
| 2005/0152323 A1 | 7/2005 | Bonnassieux et al. |
| 2005/0201306 A1 | 9/2005 | Engel |
| 2005/0245127 A1 | 11/2005 | Nordin et al. |
| 2005/0268120 A1 | 12/2005 | Schindler et al. |
| 2005/0281326 A1 | 12/2005 | Yu |
| 2006/0053324 A1 | 3/2006 | Giat et al. |
| 2006/0089230 A1 | 4/2006 | Biederman et al. |
| 2006/0165097 A1 | 7/2006 | Caveney |
| 2006/0168459 A1 | 7/2006 | Dwelley et al. |
| 2006/0181398 A1 | 8/2006 | Martich et al. |

FOREIGN PATENT DOCUMENTS

| | | |
|---|---|---|
| WO | WO 96/23377 | 8/1996 |
| WO | WO 99/53627 | 10/1999 |

OTHER PUBLICATIONS

Gibson et al; Fibre Data Distributed Interface (FDDI)—Token Ring Physical Layer Medium Dependent (PMD); American National Standard for Information Systems; ANSI X3.166-1990; 58 pages, 1990.

Gibson et al; Fiber Distributed Data Interface (FDDI)—Token Ring Physical Layer Protocol (PHY); American National Standard for Information Systems; ANSI X3.148-1988; 34 pages, 1988.

Lohse, et al; Fiber Distributed Data Interface (FDDI)—Token Ring Media Access Control (MAC); American National Standard for Information Systems; ANSI X3.139-1987; 62 pages; 1987.

IEEE Standard for a High Performance Serial Bus; IEEE Std. 1394-1995; 1996; 392 pages.

Universal Serial Bus Specification—Rev. 1.0, Jan. 15, 1996; Sec. 4.2.1 pp. 29-30. cited by other.

Universal Serial Bus Specification—Rev. 1.0, Jan. 15, 1996; Sec. 7.2.1-7.2.1.5 pp. 131-135. cited by other.

Universal Serial Bus Specification—Rev. 1.0, Jan. 15, 1996; Sec. 9.2.1-9.2.5.1 pp. 170-171. cited by other.

Universal Serial Bus Specification—Rev. 1.0, Jan. 15, 1996; Sec. 9.6.2 pp. 184-185. cited by other.

Bearfield, J.M., "Control the Power Interface of USB's Voltage Bus", Electronic Design, U.S., Penton Publishing, Clev. Ohio, vol. 45, No. 15, Jul. 1997, p. 80-86. cited by other.

RAD Data Comm. Ltd., "Token Ring Design Guide", 1994, #TR-20-01/94, Chapters 1 through 4-21. cited by other.

PowerDsine Product Catalogue 1999, pp. 56-79 and 95-105, Israel. cited by other.

ITU-T 1.430 Integrated Services Digital Network—Basic User-Network Interface—Layer 1 Specification. cited by other.

SuperStack II PS Hub User Guide; 3com; Jul. 1997; 188 pages.

SuperStack II Desktop Switch User Guide; 3Com; Jun. 1997; 148 pages.

Universal Serial Bus Specification Revision 1.0: Jan. 1996; 268 pages.

ComImpact IQ External ISDN Modem User Guide; Jul. 1997; 158 pages.

Stallings, W., Local Networks, An Introduction, pp. 1-97, 1984.

Gershon, E.; "FDDI on Copper with AMD PHY Components"; Advanced Micro Devices, Inc.; 1991, pp. 1-7.

Lavoisard, J.L. et al; "ISDN Customer Equipments"; Commutation and Transmission, No. 3, 1987, pp. 35-50.

Keller et al; "Performance Bottlenecks in Digital Movie Systems"; Proceedings of the 4th International Workshop on Network and Operating System Support for Digital Audio and Video, 1993, pp. 161-172.

Stallings, W.; "Local Networks—An Introduction" pp. ii, xii-xvi, 373-381, 1984.

Stallings, W.; "Local Networks—Second Edition" pp. l-v, viii-xiv, 427-434, 1987.

Stallings, W.; "Local Networks—Third Edition" pp. l-v, x-xvi, 499-510, 1990.

Strole, N.; "The IBM Token-Ring Network—A functional Overview"; ; IEEE Network Magazine, vol. 1, No. 1, 1987, pp. 23-30.

Willett, M.; "Token-ring Local Area Networks—An Introduction"; IEEE Network Magazine, vol. 1, No. 1, 1987, pp. 8 and 9.

"Integrated Services Digital Network (ISDN)", International Telecommunications Union, vol. III, Fascicle III.8, pp. 175-176 and 204-209, 1988.

An Interoperable Solution for FDDI Signaling Over Shielded Twisted Pair; Advanced Micro Devices, Inc.; May 1991, pp. 1-16.

SuperStack II Baseline Switch, 14-Port TP (3C16460) User Guide; 3Com; 1996 pp. 1-8.

SuperStack II Entry Hub User Guide; 3Com; 1996 pp. 1-8.

SuperStack II Baseline Switch 610 User Guide; 3Com; 1999, pp. 1-48.

SuperStack II Baseline 10/100 Switch User Guide; 3Com; 1998, pp. 1-8.

Cisco Catalyst 5000 Switching System; http://web/19961220170336/www.cisco.com; pp. 1-4, 1996.

Cisco Catalyst 5000 Series Documentation; http://web.archive.org/web/19961220192608/www.cisco.com; pp. 1-11, 1996.

Cisco Catalyst 5000 Group Switching Ethernet Modules; http://web.archive.org/web/19961220192604/www.cisco.com; pp. 1-5, 1996.

Cisco Catalyst 5000: Industry's First Modular, Multilayer-Capable Switching System for the Wiring Closet; http://web.archive.org/web/19961220192714/www.cisco.com; pp. 1-22, 1996.

Cisco Catalyst 5000 ATM Dual PHY LAN Emulation Module; http://web.archive.org/web/19961220191454/www.cisco.com; pp. 1-4, 1996.

Cisco LAN Emulation; http://web.archive.org/web/19961220192930/www.cisco.com; pp. 1-16, 1996.

Cisco Fast Ethernet 100-Mbps Solutions; http://web.archive.org/web/19961220192938/www.cisco.com; pp. 1-10, 1996.

Cisco Catalyst 5000: Industry's First Modular, Multilayer-Capable Switching System for the Wiring Closet; Cisco Systems, 1996, pp. 1-22.

3Com NBX 2101PE Basic Phone Product Details; http://www.3com.com/products/enUS/printsafe.jsp?sku=3C10248PE&pathtype=support; pp. 1-3.

Cisco Catalyst 5002 Switching System Data Sheet; Cisco Systems, 4 pages.

Cisco Catalyst 5000 Series; Cisco Systems, pp. 589-600.

Cisco Catalyst 5000 Group Switching Ethernet Modules Data Sheet; Cisco Systems, 9 pages.

Network Based Exchange—The Complete Communications Solution, NBX Corporation, 1997; 16 pages.

The Mac Reborn; Macworld, vol. 13, Issue 9, Sep. 1996, pp. 1-10.

SuperStack II Desktop Switch; 3Com, 1996, 2 pages.

CiscoPro Ether Switch CPW2115; Cisco Systems; 1995, 4 pages.

Hart Field Communication Protocol—an introduction for users and manufacturers; Hart Communication Foundation, 1995, 12 pages.

3ComImpactIQ External ISDN Modem; 3COM, 1996, 4 pages.

The Macintosh Reborn, Macworld—The Essential Macintosh Resource; 1996; 16 pages.

Cisco 2610 Router Cabling and Setup—Quick Start Guide; Cisco Systems, 1998, 18 pages.

Network Based Exchange—The Complete Communication Solution; NBX Corporation, 1997, 16 pages.

-48-Volt DC Power Supply Connection Guide, For the SuperStack II Switch 3900; Mar. 2000, pp. 1-9.

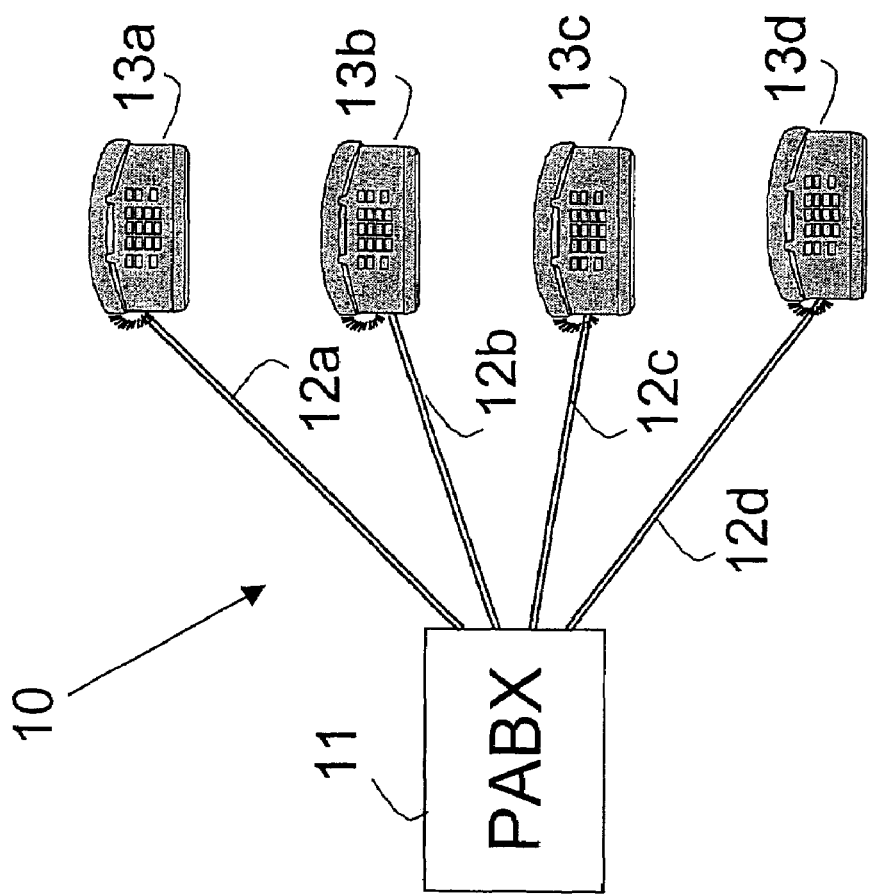
Fig. 1a (Prior-Art)

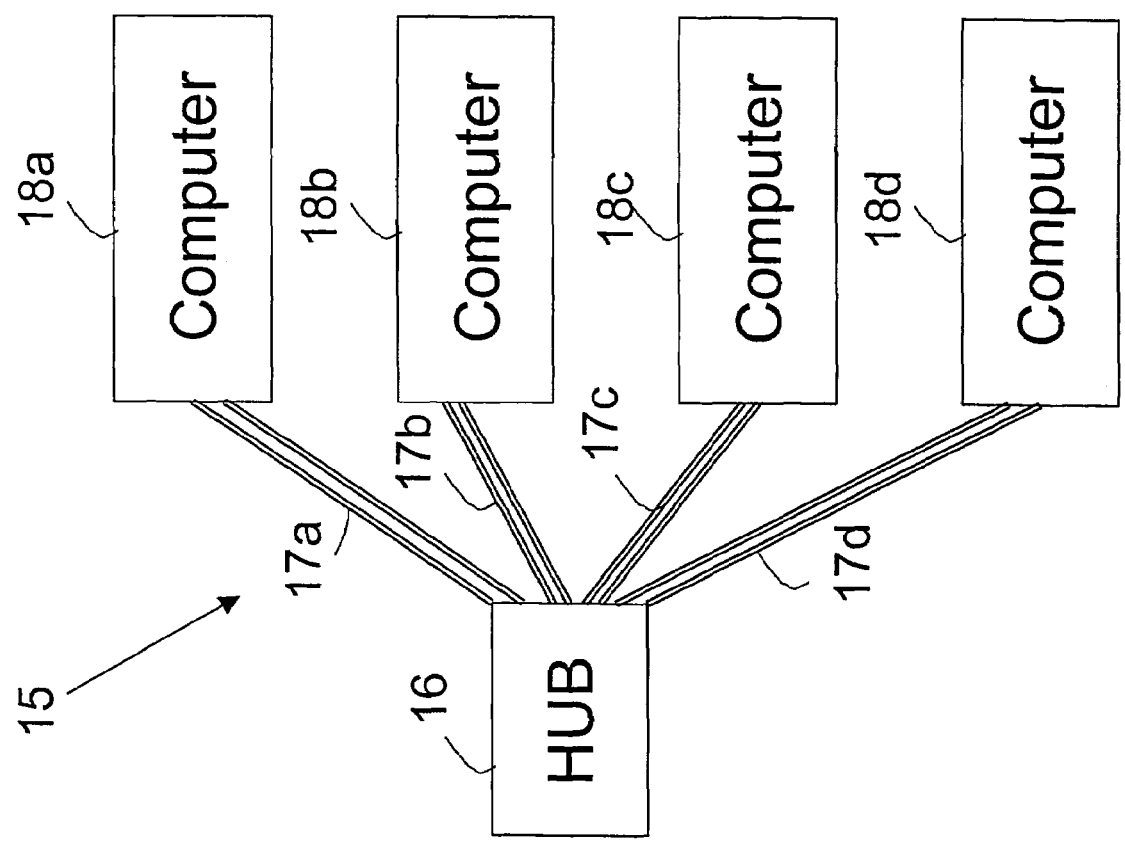
Fig. 1b (Prior-Art)

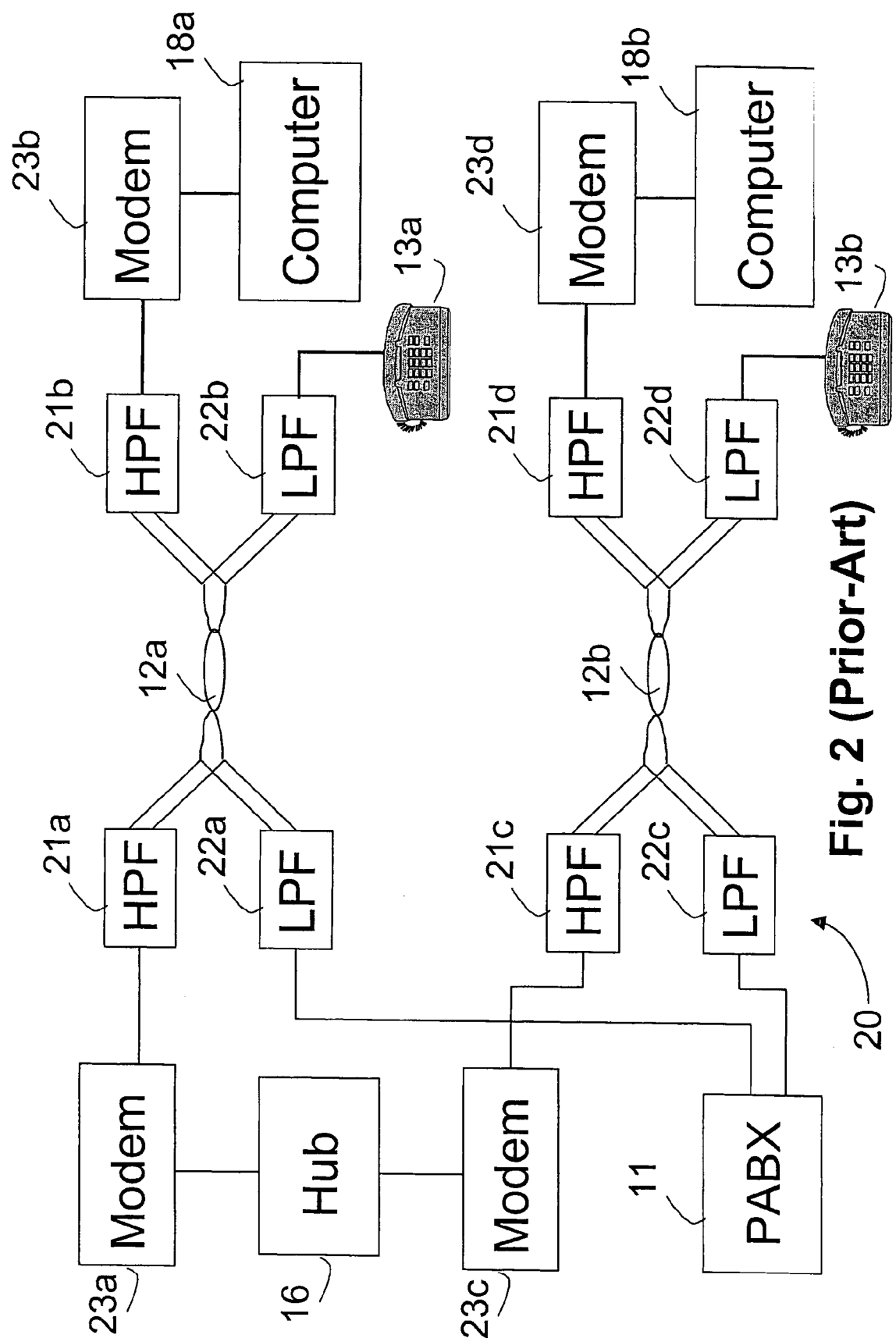
Fig. 2 (Prior-Art)

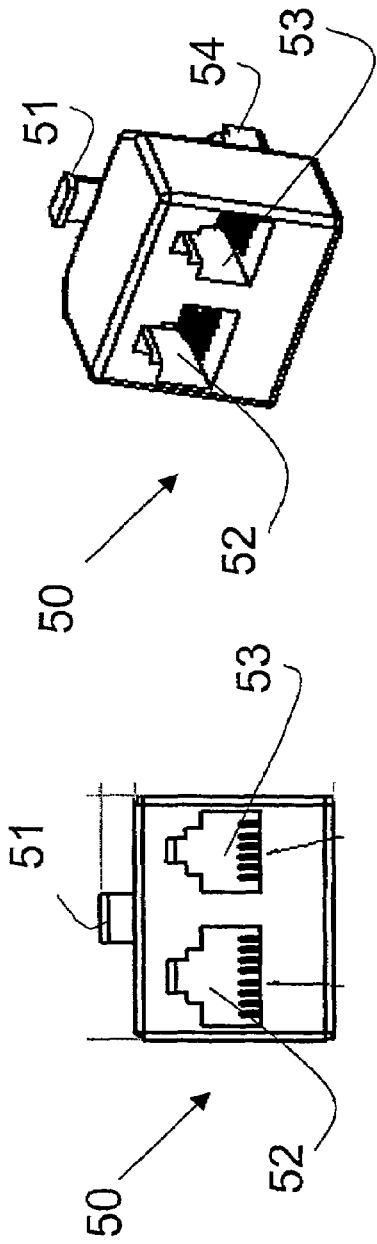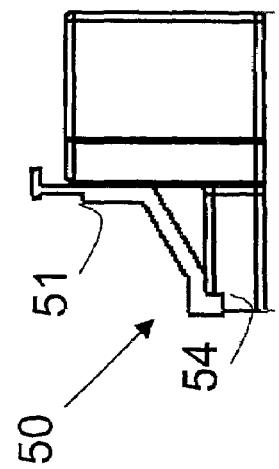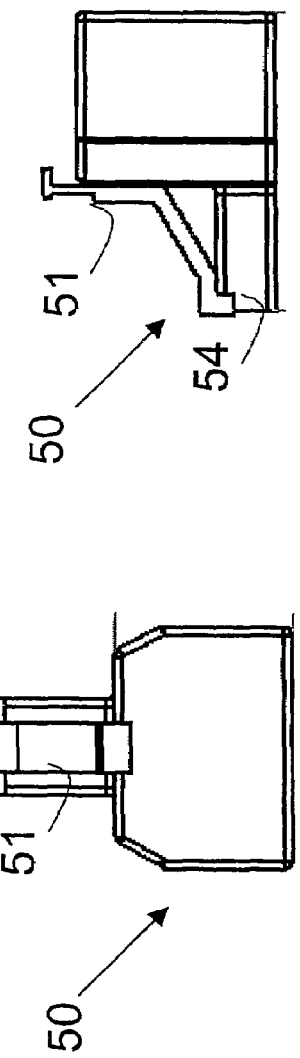

TELEPHONE COMMUNICATION SYSTEM AND METHOD OVER LOCAL AREA NETWORK WIRING

This is a continuation of co-pending parent application Ser. No. 11/125,200, filed May 10, 2005, itself a continuation of grandparent co-pending application Ser. No. 09/666,856, filed Sep. 21, 2000, now allowed.

FIELD OF THE INVENTION

The present invention relates to the field of common networks for data communication and telephony, and, more specifically, to the networking of telephone sets within a building over digitally oriented local area network wiring, simultaneously with the data transmission.

BACKGROUND OF THE INVENTION

Small office and business environments commonly employ a multiplicity of work cells, each equipped with a telephone set and a computer. Two separate networks are usually employed for communication among the cells and between them and the outside world—a telephone network, connecting between the telephone sets and outside telephone lines, and a so-called local area network (LAN), connecting the computers among themselves and to outside network lines.

The term computer or personal computer will be understood to include a workstation or other data terminal equipment (DTE) or at least one digital device capable of inputting and outputting data, whereby each computer includes an interface for connection to a local area network (LAN), used for digital data transmission; any such device will also be referred to as a remote digital device. The term telephone set will be understood to include any device which can connect to a PSTN (Public Switched Telephone Network), using telephony band signals, such as fax machine, automatic answering machine or dial-up modem; any such device will also be referred to as a remote- or local telephone device.

Such an environment is depicted in FIGS. 1a and 1b, which show a typical small office/business configuration, requiring two separate and independent networks. FIG. 1a shows a telephony network 10 comprising a PABX (Private Automatic Branch Exchange) 11, connected via lines 12a, 12b, 12c and 12d to telephone devices 13a, 13b, 13c and 13d respectively. The telephone are of the POTS (Plain Old Telephone Service) type, requiring each of the connecting lines 12 to consist of a single pair of wires.

FIG. 1b shows a local area network (LAN) 15 for allowing communication between computers. Such a network comprises a hub (or switching hub) 16, connected via lines 17a, 17b, 17c and 17d to computers 18a, 18b, 18c and 18d respectively. Popular types of LANs are based on the IEEE802.3 Ethernet standard, using 10BaseT or 100BaseTX interfaces and employing, for each connecting line 17, two twisted pairs of wires—one pair for transmitting and one pair for receiving.

Installation and maintenance of two separate networks is complicated and expensive. It would therefore be advantageous, especially in new installations, to have a combined wiring network system that serves both telephony and data communication requirements.

One approach is to provide a LAN only, which serves for normal inter-computer communication, and make it serve also for telephony. One general method for this approach, in common usage today, utilizes so-called Voice-Over-Internet-Protocol (VoIP) techniques. By such techniques, known in the art, telephone signals are digitized and carried as data in any existing LAN. Systems employing such techniques are, however, complex and expensive, and the quality of the voice carried by currently available technology is low.

Another, opposite approach is to utilize an existing telephone infrastructure for simultaneously serving as both telephone and data networking. In this way, the task of establishing a new local area network in a home or other building is simplified, because there are no additional wires to install.

U.S. Pat. No. 4,766,402 to Crane teaches a way to form a LAN over two-wire telephone lines, but without the telephone service.

The concept of frequency division multiplexing (FDM) is well-known in the art, and provides a means of splitting the inherent bandwidth of a wire into a low-frequency band, capable of carrying an analog telephony signal, and a high-frequency band, capable of carrying data or other signals. Such a technique, sometimes referred to as 'data over voice', is described, for example, in U.S. Pat. Nos. 5,896,443, 4,807,225, 5,960,066, 4,672,605, 5,930,340, 5,025,443 and 4,924,492. It is also widely used in xDSL systems, primarily Asymmetric Digital Subscriber Loop (ADSL) systems.

A typical system employing FDM is illustrated in FIG. 2, which shows schematically a combined telephony/data network 20, providing in this case connections to two work cells by means of corresponding two cables 12a and 12b, each comprising a single twisted pair of wires. The lower part of the spectrum of cable 12a is isolated by Low Pass Filters (LPF) 22a and 22b, each connected to a respective end of the cable. Similarly, the higher part of the spectrum is isolated by respective High Pass Filters (HPF) 21a and 21b. The telephony network uses the lower spectrum part by connecting the telephone 13a and the PABX 11 to the respective LPFs. In order to use the higher part of the spectrum for data communication, telephone-line modems 23a and 23b are respectively connected to the HPFs 21a and 21b at both cable ends. Hub 16 connects to modem 23a, while, on the user side, modem 23b connects to computer 18a, thus offering connectivity between the computer and the hub. The spectrum of the other cable 12b is similarly split and cable 12b connects telephone set 13b to PABX 11 via LPFs 22c and 22d, while computer 18b connects to hub 16 via modem 23d, coupled to HPF 21d, and modem 23c, coupled to HPF 21c. Additional telephones 13 and computers 18 can be added in the same manner. This prior-art concept is disclosed in U.S. Pat. No. 4,785,448 to Reichert et al. (hereinafter referred to as "Reichert") and U.S. Pat. No. 5,841,841 to Dodds et al. (hereinafter referred to as "Dodds"). Both Reichert and Dodds suggest a method and apparatus for applying frequency domain/division multiplexing (FDM) technique for residential telephone wiring, enabling simultaneously carrying telephone and data communication signals, as described above.

Network 20, employing an FDM method, typically requires two modems (such as 23a and 23b in FIG. 2) for each connected cell. Such modems are complex and expensive. In addition, the low communication quality of a typical telephone line, which was designed to carry low-frequency (telephony) signals only, limits both the data-rate and the distance of the data communication.

The concept of forming a phantom channel to serve as an additional path in a two wire-pairs communication system is known in the art of telephony, and disclosed in several patents, classified under U.S. Class 370/200. Commonly, such a phantom channel path is used to carry power to feed remote equipment or intermediate repeaters. In some prior-art systems, exemplified by U.S. Pat. Nos. 4,173,714, 3,975,594, 3,806,814, 6,026,078 and 4,937,811, the phantom channel is used to carry additional signals, such as metering and other auxiliary signals. Thus, all such systems use the phantom channel only as means for helping the communication service over the main channels. None of the mentioned prior-art uses the phantom channel for carrying an additional communication type of service, or for functionally combining two distinct networks.

It would thus be desirable to allow a data networking system to simultaneously also provide telephone service without any additional wiring.

SUMMARY OF THE INVENTION

It is an object of the invention to allow a data networking system to simultaneously also provide telephone service without any additional wiring.

This object is realized in accordance with a broad aspect of the invention by a communication network for providing simultaneous digital data- and analog telephone communication between a central location and at least one remote location, the communication network comprising:

a central digital device, a central telephone device and, for each remote location—a remote digital device, a remote telephone device and a cable having a remote end at the respective remote location and a near end at the central location;

said cable including at least two pairs of conductors, each pair operative as a data channel for carrying data signals between said remote digital device and said central digital device and said at least two pairs cooperatively forming a phantom channel, operative to carry telephone signals between said remote telephone device and said central telephone device.

Conventional data networks use a four-conductor circuit arrangement providing two communication channels between two units. For example, in a local area network based on Ethernet 10BaseT or 100BaseTX, two pairs of conductors are employed between a hub and DTE such as a computer. By means of the invention, POTS connection, such as between exchange and telephone apparatus, is accomplished simultaneously over the same four conductors used for the two communication channels without interference. The POTS service communication is accomplished via a phantom circuit arrangement over the four conductors.

Such configuration can be employed within small office or small business, wherein single wiring infrastructure is used for distributing both data and telephone signals from a central location, including a hub and an exchange to a remote station, each such station comprising a telephone unit and a data unit (e.g. desktop computer).

The present invention also provides a circuit arrangement wherein a cable that includes two twisted-conductor pairs provides both a two-way data communication channel for a connected computer and, simultaneously, a path for POTS signal to and from a connected telephone set, using the phantom channel method. In the preferred embodiment, the data communication channel consists of an Ethernet IEEE802.3 LAN channel and 10BaseT, or 100BaseTX, interfaces.

According to the invention, each two-conductor pair is terminated at each of its ends with a center tapped primary transformer winding (hereinafter cable-side winding), whereby each conductor of the pair is connected to a respective end of the cable side winding. Each winding is inductively coupled to a secondary winding (hereinafter referred to as equipment side winding), whose ends are connected to another pair of conductors that form the continuation channel for the data carrying signal, wherein the equipment side winding is connected to the data communication equipment. The center taps of each of the two primary winding at any end of the cable are connectable to the respective conductors of a telephone circuit, to carry the POTS signals. Thus, the two pairs of conductors at opposite ends of the cable, through the center taps of the respective primary transformer windings, form first and second connections of the two conductor phantom channel, which is used for carrying the telephone signal.

The invention can be implemented by means of two modules—one at each end of the two-conductor-pairs cable. Each module comprises two transformers, with a center-tap in the primary (cable side) winding. The module retains the two-pair data communication capability, while simultaneously including a phantom channel via the center-tap connections, for telephone service. The phantom channel can be accessed via a connector in the module. The module can be a stand-alone unit, or integrated within any unit in the network, such as a digital network hub, a telephone exchange, a server computer or telephone set. Alternatively, the module can be integrated within a wall outlet connected to one or both ends of the cable.

In another embodiment, the modules form a kit, which is used to upgrade an existing local area network to support telephone networking also.

The invention can be used in a small office or small business environment, which has a central location that comprises a telephone exchange and a digital network concentration unit (such as a hub, a switch or a router), connected to multiple remote work stations via LAN wiring.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1a and 1b show respectively a common prior art telephone and Local Area Network configuration as used within a small office or a small business;

FIG. 2 shows a prior art telephone and local area networks using the telephone-wiring infrastructure;

FIGS. 7a to 7d show different views of an attachable wall plug connector that adds a phantom channel telephone service to an existing data communication system according to the present invention.

DETAILED DESCRIPTION OF THE INVENTION

Figure 3:
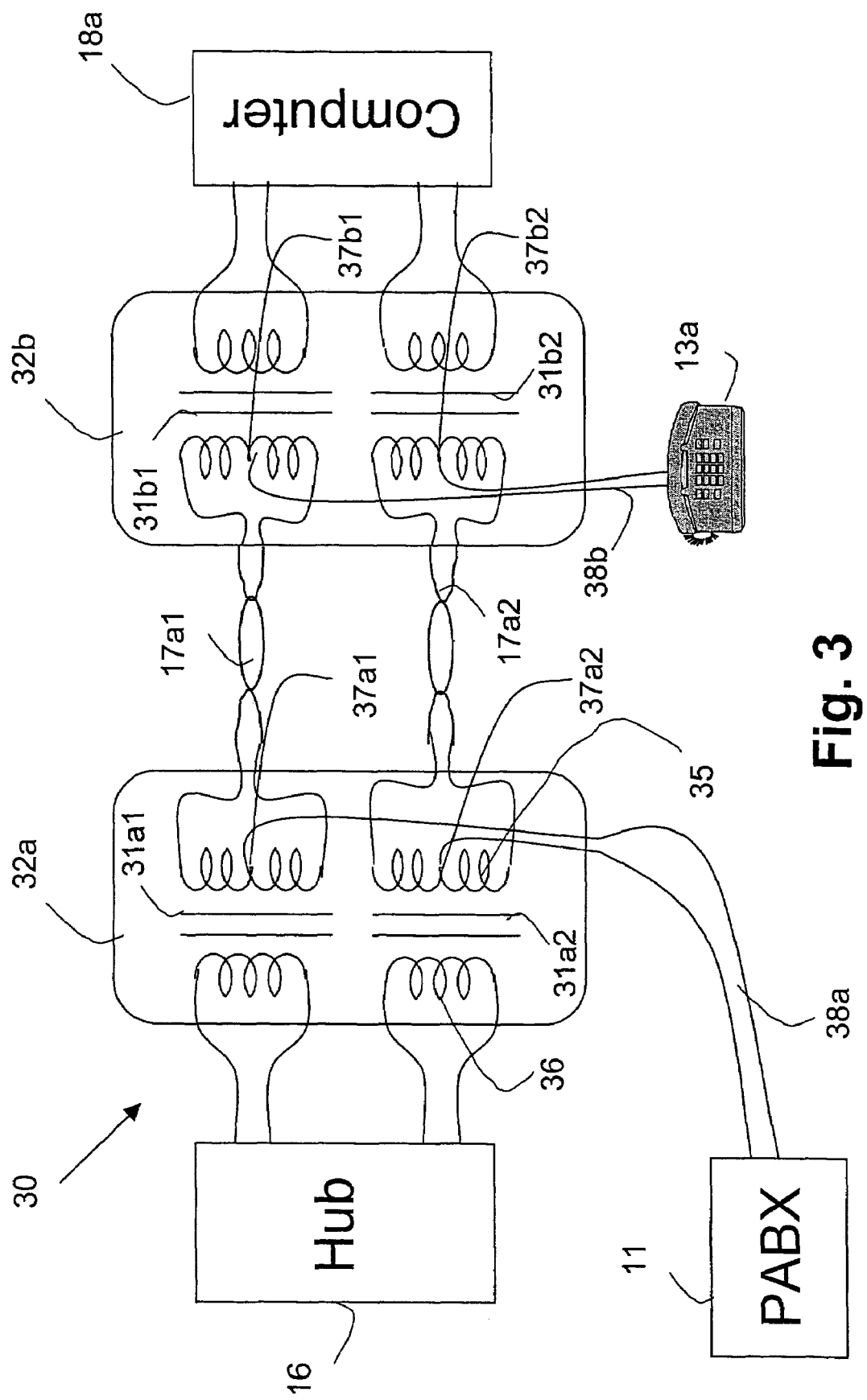
FIG. 3 shows a combined telephone and data communication network according to the present invention.

In the following description it is to be noted that the drawings and descriptions are conceptual only. In actual practice, a single component can implement one or more functions; alternatively, each function can be implemented by a plurality of components and circuits. In the drawings and descriptions, identical reference numerals are use to indicate those components that are common to different embodiments or configurations.

FIG. 3 illustrates a preferred embodiment of the present invention. The network 30 is a part of an IEEE802.3 local area network, using 10BaseT interfaces. A hub 16, defining a central location, is connected to a typical computer 18a via a cable that includes two wire pairs 17a1 and 17a2. Each pair is operative to carry data in one direction only, one pair, say 17a1, carrying data from the hub 16 to the computer 18a, while the other pair, 17a2, carries data in the other direction. FIG. 3 also shows a telephone set 13a, associated with computer 18a and preferably near it, and a telephone private automatic branch exchange (PABX) 11, which is preferably also at the central location. The term hub is used herein to represent any digital network concentrating unit and may equally refer to a switching hub, a router, a server computer or to any digital device having multiple data ports; any of these being also referred to herein as a central digital device. Similarly, PABX is used herein to represent any type of central telephone switching unit and will also be referred to as a central telephone device.

According to the invention, a signal transformer is inserted at each end of each wire pair, whereby, for example, transformer 31a1 is inserted at the end of wire pair 17a1 that is near hub 16 and transformer 31b1 is inserted at the end of wire pair 17a1 that is near computer 18a. Similarly, transformers 31a2 and 31b2 are inserted at the ends of wire pair 17a2 that are near hub 16 and computer 18a, respectively. The signal transformers bearing the prefix 31 are designed so that the signal attenuation via these transformers is negligible. Hence, the performance of the data communication network is fully retained, and the hub 16 continues to communicate fully with the computer 18a in the usual manner. Such transformers are known in the art and are often used in LANs, in order to meet isolation and common-mode rejection requirements. Commonly, such signal transformers are equipped with a primary winding and a secondary winding both being untapped coils. In the invention, each signal transformer bearing the prefix 31, say 31a2 has a primary winding 35, whose ends are connected to the respective wires of the cable, and a secondary winding 36, whose ends are connected to the respective system component (hub 16 or computer 18a).

However, unlike the conventional configuration for signal transformers, according to the present invention each primary winding 35 has a center-tap shown as 37a1 and 37a2, for the two signal transformers 31a1 and 31a2, respectively. PABX 11 is connected, via two respective wires 38a, to the center-taps 37a1 and 37a2 of transformers 31a1 and 31a2. Similarly, the telephone set 13a is connected, via two respective wires 38b, to the center-taps 37b1 and 37b2 of transformers 31b1 and 31b2, respectively. In this configuration, the telephony signals are carried in a 'phantom' way together with the data communication signals, without any interference between the two. In practice, the hub side transformers 31a1 and 31a2 may be integrated to form a module 32a, while the computer side transformers 31b1 and 31b2 may be integrated to form a module 32b. While the network 30 has so far been described as supporting a single computer and a single telephone, additional work cells, each comprising a telephone and a computer can be supported, whereby each computer is connected with hub 16 through a corresponding two wire pairs cable, by inserting an additional set of modules 32a and 32b in each such cable.

Figure 4:
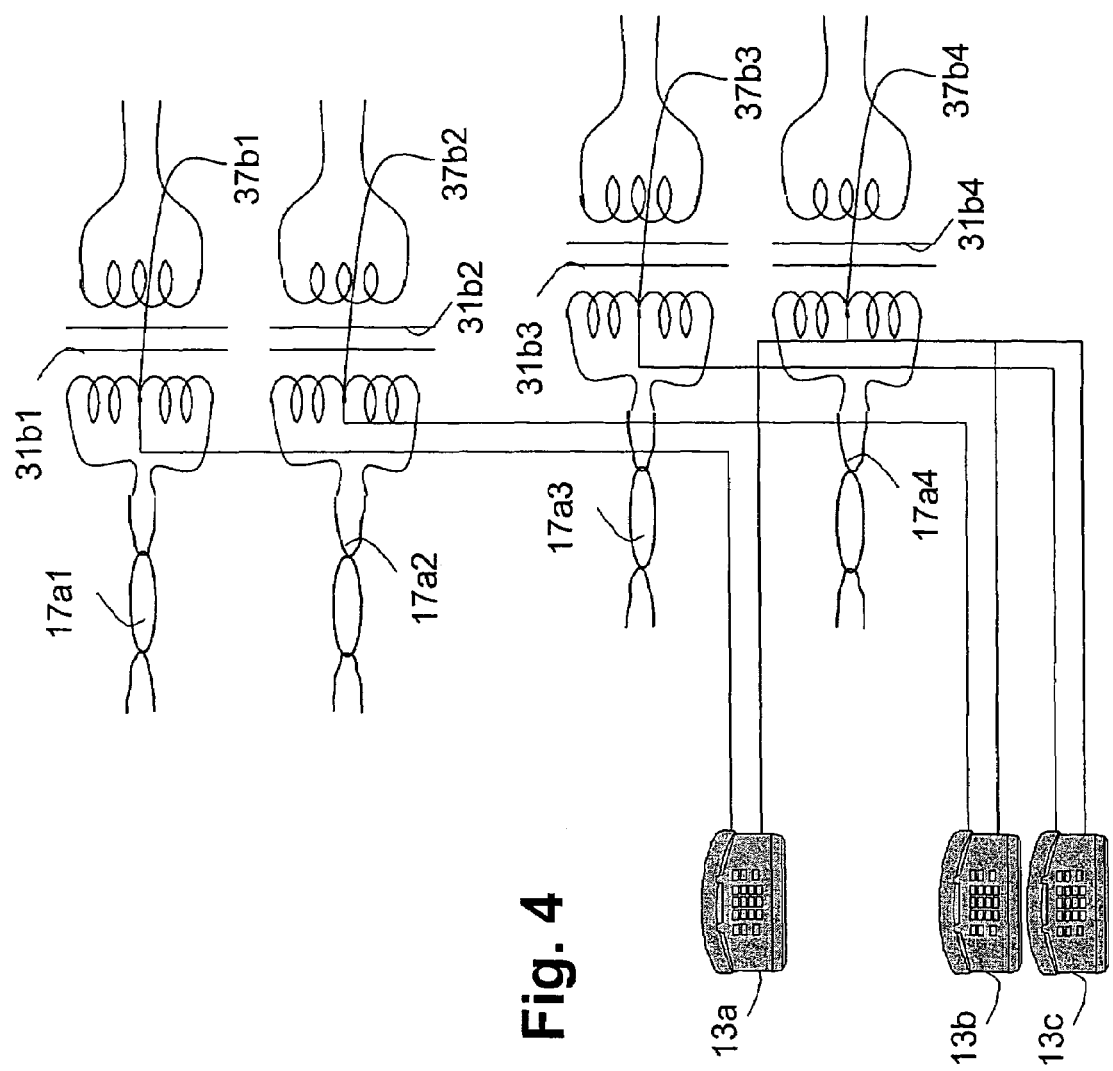
FIG. 4 shows schematically a data communications network having multiple phantom channels according to the present invention all sharing a common return.

While the invention has been described specifically for 10BaseT (10 Mb/s) interfaces, the invention can be equally applied to 100BaseTX (100 Mb/s) interfaces. Furthermore, the invention can be equally applied in any wired networking system using at least two wire pairs. Transformers can be used in all wired communication systems whose signals do not include direct current (DC) components. In systems that use four or more pairs of wires, such as those based on the evolving 1000BaseTX Ethernet standard, each two pairs can be used to form a single phantom channel. Thus, four pairs can form two phantom channels, each carrying one POTS circuit, by terminating each pair with a transformer as described above. Alternatively and preferably, as shown in FIG. 4, three pairs 17a1, 17a2 and 17a3 can each form a phantom channel with the fourth pair 17a4, which serves as the common return path. In this case, each telephone circuit 13a, 13b and 13c has one of its two wires connected to the center-tap 37b1, 37b2 and 37b3 of the respective transformer 31b1, 31b2 and 31b3 at the corresponding end of the respective pair and the other wire—to the center-tap 37b4 of the transformer 31b4 at the corresponding end of the common pair. More generally, with N pairs of conductors, each pair serving as a data channel, it is possible to similarly provide N−1 phantom channels for telephone service.

In the configuration shown in FIG. 3 the modules 32a and 32b are stand-alone modules, mechanically separate from other components in the network. However, also other configurations are possible. For example, the hub side module 32a can be integrated, fully or in part, within the hub 16. In such a case, the hub's existing data connection-unit (such as a distribution frame—for connecting thereto all line pairs) is preferably substituted by one that includes module 32a; in addition, a telephone connector is provided, for connecting all telephone lines (whose other ends are connected to their respective center taps in module 32a) to the PABX. Alternatively, module 32a can be similarly integrated within PABX 11, whereby an appropriate connection with the hub is provided.

Figure 5A:
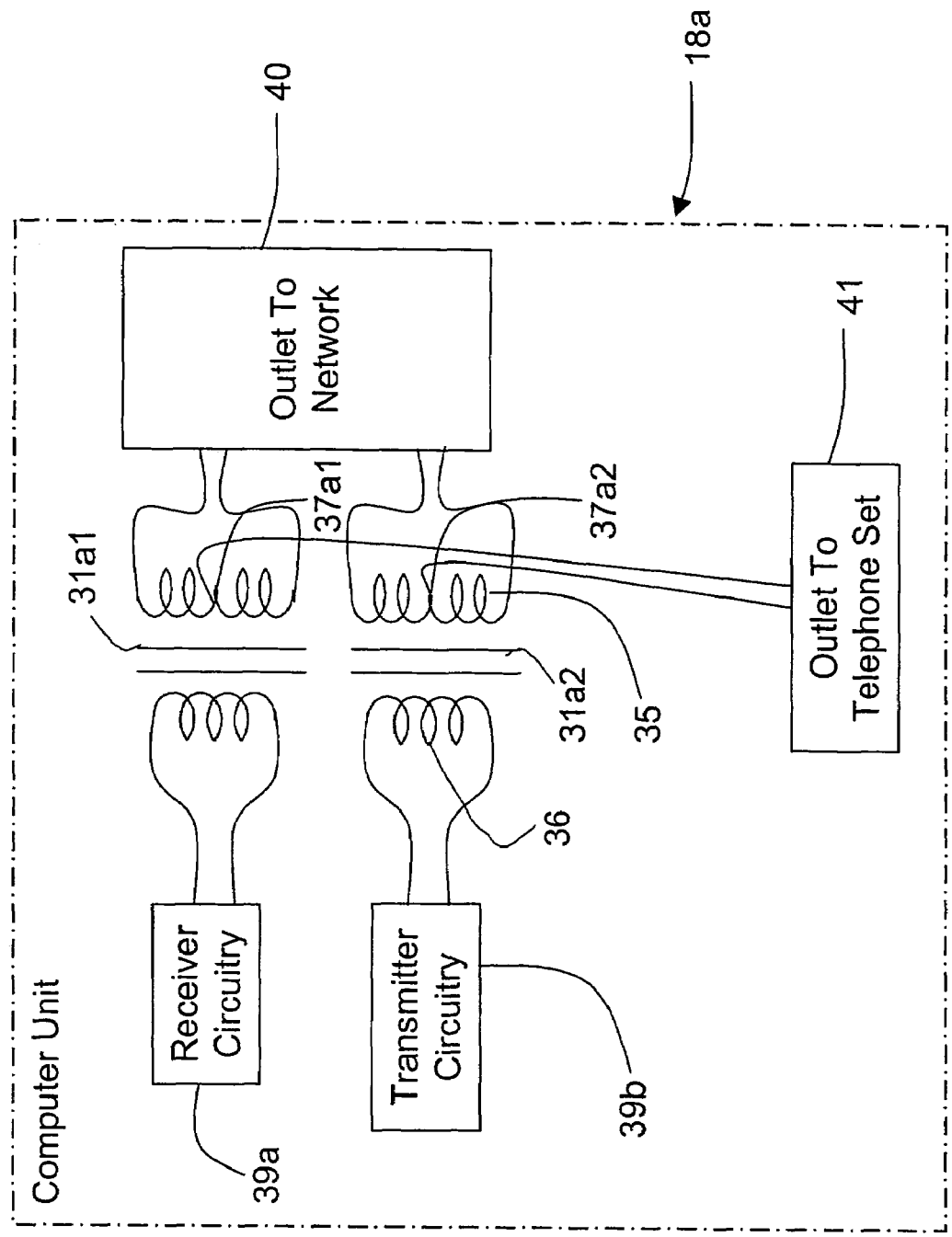
FIG. 5a shows schematically a computer modified according to the invention for direct coupling to a telephone set.

FIG. 5a shows schematically an arrangement where the computer side module 32b is integrated, fully or in part, within the computer 18a. Thus, the secondary windings 36 of the transformers 31a1 and 31a2 are connected to receiver and transmitter circuitry 39a and 39b within the computer 18a. The ends of the primary windings 35 of the transformers 31a1 and 31a2 are connected to a standard socket outlet 40 for connecting to the network. The center-taps 37a1 and 37a2 are connected to a standard telephone outlet 41, enabling connection thereto of a telephone set such as designated 13a in FIG. 3.

Figure 5B:
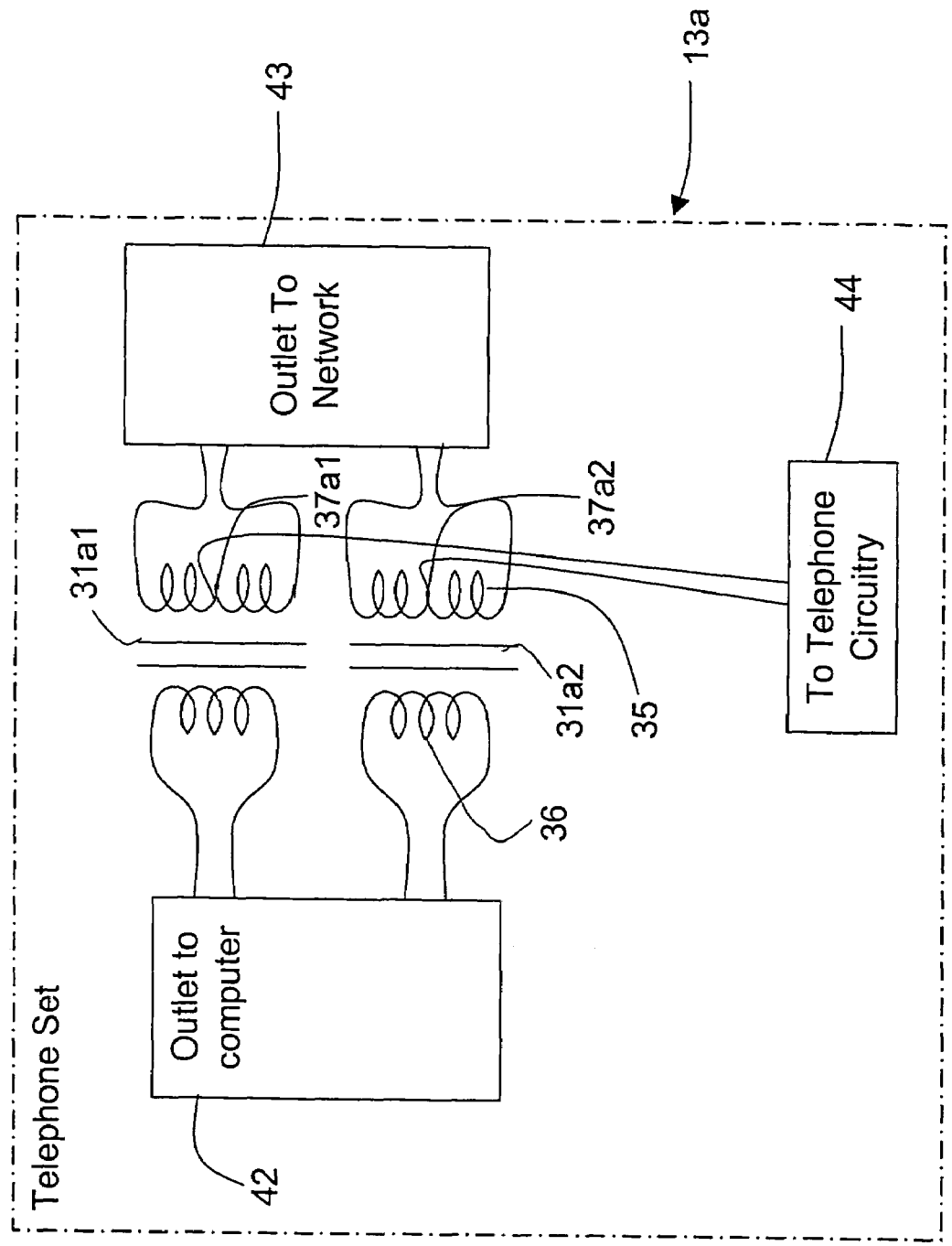
FIG. 5b shows schematically a telephone set modified according to the invention for direct coupling to a computer.

FIG. 5b shows schematically the complementary arrangement where the module 32b is integrated the telephone set 13a. Thus, the secondary windings 36 of the transformers 31a1 and 31a2 are connected to a standard outlet 42 for connecting thereto a computer such as designated 18a in FIG. 3. The ends of the primary windings 35 of the transformers 31a1 and 31a2 are connected to a standard socket outlet 43 for connecting to the network. The center-taps 37a1 and 37a2 are connected to telephone circuitry 44, within the telephone set 13a.

Alternatively, the computer side module 32b can be integrated within a wall connector allowing direct or indirect connection to an existing wall socket outlet. Thus, such a wall connector can be constituted by a substitute wall socket having integrated therein a pair of signal transformers and two female outlets for connecting a computer and telephone thereto, respectively. Alternatively, the wall connector can be constituted by a plug connector having integrated therein a pair of signal transformers and two female outlets for connecting a computer and telephone thereto, respectively. Such a plug connector allows a computer and telephone to be connected to an existing wall socket outlet without requiring any modification thereto.

Figure 6:
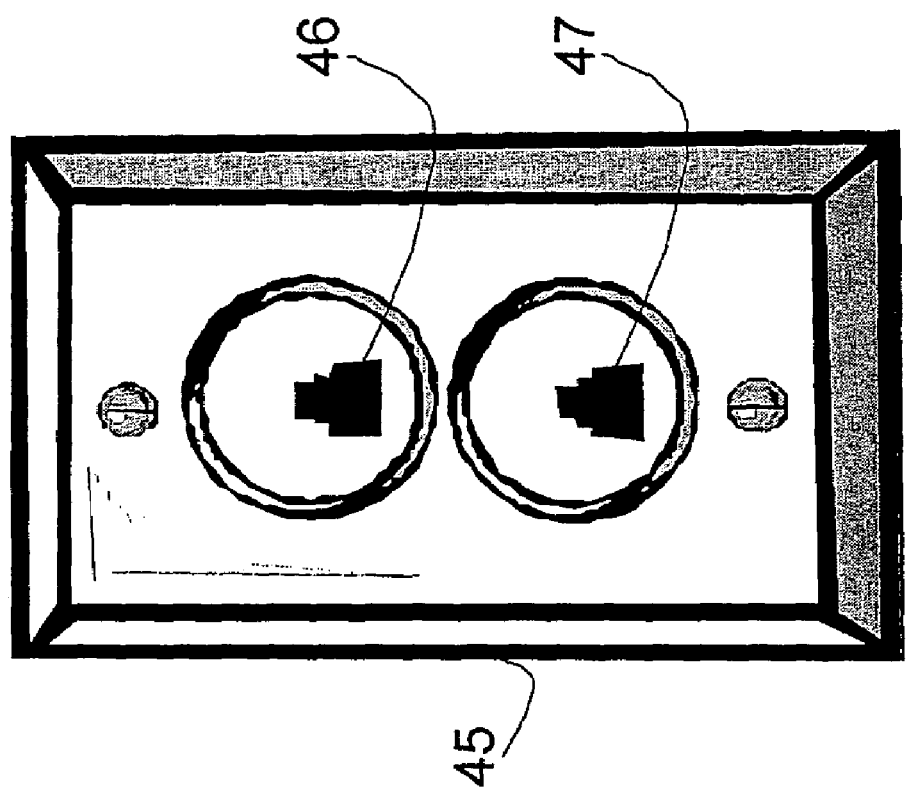
FIG. 6 shows modified wall outlet that adds a phantom channel telephone service to an existing data communication system according to the present invention.

FIG. 6 shows the faceplate of a modified socket outlet 45 according to the invention. Two conductor pairs are connected to the outlet at the rear (not shown in the Figure), connected to the primary windings of two signals transformers housed in it (not shown in the Figure). The secondary windings of the transformers are connected to RJ-45 data connector 46, while the center taps are connected to the RJ-11 telephony connector 47. Such an outlet is physically similar in size, shape, and overall appearance to a standard outlet, so that such an outlet can be substituted for a standard outlet in the building wall. No changes are required in the overall LAN line layout or configuration. Such an outlet can easily substitute an existing standard data outlet to thus additionally provide telephony support. Thus a conventional outlet has a single female connector having two pairs of wiper contacts connected to the respective twisted-wire pairs for data transmission and reception. A computer is plugged into such a conventional outlet via a single male connector (plug) having four pins: two for handling data transmission and two for handling data reception. On inserting the plug into the socket outlets, the pins brush against the wiper contacts in the socket outlet, thus establishing electrical connection between the two.

The invention allows for the conventional outlet to be replaced by a modified outlet having therein a pair of signal transformers, the ends of whose respective primary windings are adapted to be connected to the ends of a respective conductor pair in the network. The secondary winding of each signal transformer is connected internally to a respective pair of wiper contacts of a first female connector. Thus, the ends of both secondary windings are connected to first female connector by means of four wiper contacts in total. The respective center-taps of each of the two primary windings are connected to a pair of wiper contacts in a second female connector proximate the first female connector. Thus, a computer can be connected, via four pins of a suitable jack plug, to the first female connector, while a telephone can be connected, via two pins of a suitable jack plug to the second female connector. The two wire pairs 17a1 and 17a2 are routed and connected to such an outlet, which will now comprise two faceplate connectors—a data connector (e.g. RJ-45 for 10BaseT) and a telephone connector (e.g. RJ-11).

Such an implementation requires that the socket outlets in an existing data network be replaced by a modified outlet according to the invention. FIGS. 7a to 7d show various views of a plug assembly 50 according to the invention for operation in 10BaseT or 100BaseTX environment that allows the invention to be implemented without requiring any modification to the data network or to the existing socket outlet. In use, the plug assembly 50 is plugged into a standard socket outlet and is retained therein by means of a latch 51. The plug assembly 50 contains the module 32b connected to separate data- and telephony socket outlets 52 and 53 in a similar manner to the modified socket outlet 45 described above with reference to FIG. 6. A standard RJ45 jack plug 54 is connected to the module 32b for mating with the wall outlet when plugged into its socket. The jack plug 54 thus includes two pairs of pins each connected to the primary winding of a respective signal transformer within the module 32b. The secondary windings of the two signal transformers are connected to respective wiper contacts in the data-telephony socket outlet 52. The respective center-taps of each of the primary windings are connected to a pair of wiper contacts in the telephony socket outlet 53 proximate the data-telephony socket outlet 52. Cables from the computer and the telephone set terminate in standard jack plugs that are plugged into the respective data- and telephony socket outlets 52 and 53 within the plug assembly 50. Thus, the plug assembly 50 obviates the need for any changes to be made to the existing infrastructure.

As mentioned above, 10BaseT and 100BaseTX interfaces, as well as other data communication interfaces, often include signal transformers in the line connection circuitry, in order to meet isolation and common-mode rejection requirements. In such cases, additional transformers, though possible, are not required and the method of the present invention can be implemented by adding center-tap connections to the respective windings of the existing transformers and using them to form a phantom channel, to serve for telephone connection in the manner described above. Alternatively, the existing transformers can be substituted by ones with center-taps as specified above.

It is noted that, while a phantom channel has been known in the art, its use in the system and method disclosed herein is novel, because:

(a) Local area networks (LANs) in general, and Ethernet networks in particular, currently do not employ phantom channels, nor is any configuration employing such channels specified in the IEEE802.3 standards; the concept is known in the realm of telephony only, which is very different from that of data communication LANs.

(b) Using a phantom channel itself to carry POTS service is not known in the art; rather, phantom channels are used only to carry power to remote units and/or management- or control signals to support the main service that is provided by the two conductor pairs.

While the invention is described above relating to hub units, it is clear that any other multi-port data communication device can be used, such as switch, router or gateway.

The present invention also embraces a method for upgrading an existing local area network (LAN) installation that includes a two-conductor pair cable between two digital devices, to also and simultaneously convey signals between two telephone devices, the method comprising:

(a) inserting a first pair of signal transformers having center-tapped primary windings at a first end of the cable, with respective ends of the primary windings connected to respective conductors of the cable; and (b) inserting a second pair of signal transformers having center-tapped primary windings at a second end of the cable, with respective ends of the primary windings connected to respective conductors of the cable;

thereby allowing respective secondary windings of each signal transformer to be connected to the digital devices and allowing the respective center-taps of the signal transformers to be connected to telephone equipment.

If the LAN already includes signal transformers that do not have center-taps, they are, in step (a) above, replaced by the specified transformers or, alternatively, a center-tap is added to each primary winding.

While the invention has been described with respect to a limited number of embodiments, it will be appreciated that many variations, modifications and other applications of the invention may be made.

What is claimed is:

1. A circuit arrangement for coupling an information device and a digital data device to a local area network cable having at least first and second twisted wire pairs in a building, and simultaneously carrying a full-duplex packet-based digital data signal and an information signal, the circuit arrangement comprising:

a first local area network connector connectable to the local area network cable;

a second local area network connector connectable to a digital data device for coupling the full-duplex packet-based digital data signal to the digital data device; and an information port couplable to the information device for coupling the information signal to the information device, wherein each of the first and second twisted pairs is operative to carry a packet-based digital data signal, and the at least two twisted pairs cooperatively form a phantom channel operative to carry the information signal.

2. The circuit arrangement according to claim 1, further comprising:

a first signal transformer having a primary winding and a secondary winding, said first signal transformer being connected between said first local area network connector and said second local area network connector, said primary winding having a center-tap connection, and said first signal transformer being operative to pass the local area network packet-based digital data signal; and a second signal transformer having a primary winding and a secondary winding, said second signal transformer being connected between said first local area network connector and said second local area network connector, said primary winding having a center-tap connection, and said second signal transformer being operative to pass local area network packet-based digital data signals;

wherein said center tap connections of said first and second signal transformers are connected to said information port.

3. The circuit arrangement according to claim 1, wherein said first and second local area network connectors are RJ-45 type, and the local area network packet-based digital data signals are based on 10/100BaseT according to IEEE802.3 protocol.

4. The circuit arrangement according to claim 1 having the external dimensions of an outlet.

5. The circuit arrangement according to claim 1 configured as a plug-in to an outlet.

6. The circuit arrangement according to claim 1 further attachable to a surface of a building.

7. The circuit arrangement according to claim 1 wherein the information signal is an analog signal, and said information port is an analog connector.

8. The circuit arrangement according to claim 7 wherein the information signal is an analog voice signal, and the information port is an analog voice connector.

9. The circuit arrangement according to claim 8 wherein the analog voice signal is a telephone signal and the analog voice connector is a telephone connector.

10. The circuit arrangement according to claim 1 wherein a DC power signal is concurrently carried over said phantom channel.

11. The circuit arrangement according to claim 1 wherein the local area network cable comprises N twisted wire pairs cooperatively forming N-1 phantom channels, where N is equal or greater than 3.

12. The circuit arrangement according to claim 1 wherein the information signal is bi-directionally carried between the first local area network connector and the information port.

13. A kit comprising first and second circuit arrangements, each according to claim 1, for use with a local area network cable connectable between first local area network connectors of said first and second circuit arrangements for simultaneously transporting information and digital data signals over a local area network comprising at least two twisted wire pairs, for transporting an information signal from a first information device connectable to the information port of said first circuit arrangement to a second information device connectable to the information port of said second circuit arrangement over the twisted wire pairs that form the phantom channel, simultaneously with transporting a full-duplex packet-based digital data signal from a first digital data device connectable to said second local area network connector of said first circuit arrangement to a second digital data device connectable to said second local area network connector of said second circuit arrangement over the twisted pairs.

14. A local area network in a building for simultaneously carrying a full-duplex packet-based digital data signal between first and second digital data units and an information signal between first and second information units, the network comprising:

a local area network cable at least in part in a wall of the building and accessed via outlets, having first and second ends and comprising at least two twisted wire pairs, each wire pair being operative to carry the packet-based digital data signal, and said at least two twisted wire pairs cooperatively forming a phantom channel simultaneously operative to carry the information signal;

a first device connected to said first end of said local area network cable, said first device being couplable to the first digital data unit for coupling the packet-based digital data signal to the first digital data unit, and being further couplable to the first information unit for coupling the information signal to the first information unit; and a second device connected to said second end of said local area network cable, said second device being couplable to the second digital data unit for coupling the packet-based digital data signal to the second digital data unit, and being further couplable to the second information unit for coupling the information signal to the second information unit.

15. The network according to claim 14, wherein at least one of said first and second devices comprises:

a first signal transformer having a primary winding and a secondary winding, said first signal transformer being connected between said local area network cable and the digital data unit, said primary winding having a center-tap connection, and said first signal transformer being operative to pass the local area network packet-based digital data signals; and a second signal transformer having a primary winding and a secondary winding, said second signal transformer being connected between said local area network cable and the digital data unit, said primary winding having a center-tap connection, and said second signal transformer being operative to pass the local area network packet-based digital data signals;

wherein said center tap connections of said first and second signal transformers are coupled to the information unit.

16. The network according to claim 14, wherein said first and second devices are connected to the local area network cable via RJ-45 type connectors, and the local area network packet-based digital data signals are based on 10/100BaseT according to IEEE802.3 protocol.

17. The network according to claim 14 wherein at least one of said first and second devices has the external dimensions of an outlet.

18. The network according to claim 14 wherein at least one of said first and second devices is configured as a plug-in to an outlet.

19. The network according to claim 14 wherein at least one of said first and second devices is further attachable to a surface of the building.

20. The network according to claim 14 wherein the information signal is an analog signal.

21. The network according to claim 14 wherein the information signal is an analog voice signal.

22. The network according to claim 21 wherein the analog voice signal is a telephone signal and at least one of the information units is an analog telephone device.

23. The network according to claim 14 wherein a DC power signal is concurrently carried over said phantom channel.

24. The network according to claim 14 wherein the local area network cable comprises N wire pairs cooperatively forming N-1 phantom channels, where N is equal or greater than 3.

25. The network according to claim 14 wherein the information signal is bi-directionally carried between the first and second information units.

26. The network according to claim 14 wherein said first device and the first digital data unit are housed in a single enclosure.

\* \* \* \* \*